US005785579A

United States Patent [19]
Grondin

[11] Patent Number: 5,785,579
[45] Date of Patent: Jul. 28, 1998

[54] GLASS MATERIAL FOR TREATING HARD SURFACES

[76] Inventor: Roger Grondin, 823 West, 7e rue, Dégelis, Quebec, Canada, G5T 1Z3

[21] Appl. No.: 749,764

[22] Filed: Nov. 20, 1996

Related U.S. Application Data

[63] Continuation-in-part of Ser. No. 846,074, Mar. 5, 1992, abandoned.

[51] Int. Cl.$^6$ .................................. B24B 1/00; C09C 1/68
[52] U.S. Cl. .................................. 451/38; 51/307; 51/308
[58] Field of Search .................. 51/307, 308; 451/38, 451/41

[56] References Cited

U.S. PATENT DOCUMENTS

| | | | |
|---|---|---|---|
| 3,019,522 | 2/1962 | Bluth et al. | 29/552 |
| 3,225,495 | 12/1965 | De Vries | 51/319 |
| 3,425,250 | 2/1969 | Farris et al. | 72/53 |
| 3,650,396 | 3/1972 | Gillespie et al. | 209/3 |
| 3,912,534 | 10/1975 | Gurta | 134/19 |
| 4,035,962 | 7/1977 | Ayers | 51/308 |
| 4,065,282 | 12/1977 | Morey | 65/28 |
| 4,188,228 | 2/1980 | Brzozowski | 106/50 |
| 4,353,725 | 10/1982 | Hohman et al. | 65/27 |
| 4,414,013 | 11/1983 | Connell | 65/28 |
| 4,832,700 | 5/1989 | Kaspar et al. | 23/313 |
| 4,947,591 | 8/1990 | Risley | 51/320 |
| 4,968,441 | 11/1990 | Halter et al. | 252/2 |
| 4,983,068 | 1/1991 | Kozak et al. | 405/36 |
| 4,997,485 | 3/1991 | Lamoni | 106/753 |
| 5,106,598 | 4/1992 | Cogar | 423/99 |

*Primary Examiner*—Deborah Jones
*Attorney, Agent, or Firm*—Michael D. Bednarek; Kilpatrick Stockton LLP

[57] ABSTRACT

The glass material for treating hard surfaces by being continually hurled at high velocity against the surfaces, includes substantially particles of broken glass provided from glass parts having a thickness greater than $75/1000$ of an inch, the particles having sizes as selected with mesh sieve sizes of grade 5 to grade 60, having sharp edges and having a hardness greater than 5.5 Mohs.

7 Claims, 2 Drawing Sheets

GLASS MATERIAL FOR TREATING HARD SURFACES

This is a continuation in part of application Ser. No. 7/846,074, filed Mar. 5, 1992, now abandoned.

FIELD OF THE INVENTION

The invention relates to a glass material for treating hard surfaces by continually hurling the glass material at high velocity against the hard surfaces. More particularly, the present invention relates to an abrasive product made from flat glass or hollow recycled glass.

BACKGROUND OF THE INVENTION

In the field of sandblasting, there are several abrasive products on the market. Concerning down-market products, silica sand which has a hardness around 5.5 Mohs is used for most of the applications. The sand particles are hurled at high velocity against a hard surface under a pressure of 60 to 100 PSI. It is desirable to replace this product because silica sand causes silicosis which is a disease of the lungs caused by continued inhalation of the dust of siliceous minerals and characterized by progressive fibrosis and a chronic shortness of breath.

It has been found that the use of an abrasive containing more than 1% of free silica can cause silicosis, as it is the case with the use of silica sand, different beach sands and olivine. Most of these abrasive products are characterized by a large granulometric distribution so that it produces a lot of dust during sandblasting. The inhalation of dust of this material is harmful for the health of the user or any bystander.

Also known on the market, there is an abrasive product made of glass beads which are not harmful for the health for the user. However this product has a low abrasiveness because of its spherical shape devoid of sharp edges and it is furthermore much more expensive than silica sand. The glass beads are only used for polishing.

Also known in a related art, there is U.S. Pat. No. 5,106,598 of Michael J. Cogar granted on Apr. 21, 1992. This patent is mainly concerned with a process and system for disposing of fluorescent lamps but briefly mentions the possible use of the recovered glass for abrasive blasting of selected surfaces. The glass recovered from fluorescent lamps is a fragile material having a hardness of 4.5 Mohs which is lower than that of silica sand which is around 5.5 Mohs. It should be appreciated that his glass material recovered from fluorescent lamps has a hardness lower than that of silica and consequently, it is not as efficient as silica sand for sandblasting. Furthermore, it should be noted that this glass material has a thickness around 40/1000 of an inch and has the shape of chips. On the one hand, this chip-shaped material cannot be used in regular sandblasting machines because of the shape thereof. On the other hand, when this material is used for sandblasting at a regular pressure of 60 to 100 PSI, it shatters into dust and forms dust clouds which considerably reduces the visibility of the work area. If the material is used at a lower sandblasting pressure, it further lowers the efficiency of the sandblasting.

It is an object of the present invention to provide an abrasive product that has a fairly good abrasiveness, that is not harmful for the health of the user or any bystander, and that can be produced at a cost similar to the one for producing silica sand.

SUMMARY OF THE INVENTION

According to the present invention, there is provided a glass material for treating hard surfaces by continually hurling the glass material at high velocity against said surfaces, the glass material comprising particles of broken glass provided from glass parts having a thickness greater than 75/1000 of an inch, the particles having sizes as selected with mesh sieve sizes of grade 5 to grade 60, having sharp edges and having a hardness greater than 5.5 Mohs.

Also according to the present invention, there is provided a process for making said particles of broken glass material used for treating hard surfaces by continually hurling the glass material at high velocity against said surfaces, comprising steps of:

(a) burning recycled or scrap glass material to eliminate unwanted material, the recycled or scrap glass material having a hardness greater than 5.5 Mohs and a thickness greater than 75/1000 of an inch;

(b) screening coarsely glass material obtained from step (a);

(c) submitting glass material obtained from step (b) to an electromagnet to remove unwanted metal pieces;

(d) grinding glass material obtained from step (c) to produce broken glass material; and (e) sifting said broken glass material obtained from step (d) to obtain said particles of broken glass, said particles having sizes of grade 5 to grade 60, having sharp edges, having a hardness greater than 5.5 Mohs, whereby said particles of broken glass can be used for treating hard surfaces.

The objects, advantages and other features of the present invention will become more apparent upon reading of the following nonrestrictive description of preferred embodiment thereof, given for the purpose of exemplification only with reference to the accompanying drawings.

DETAILED DESCRIPTION OF THE DRAWINGS

Figure 1:
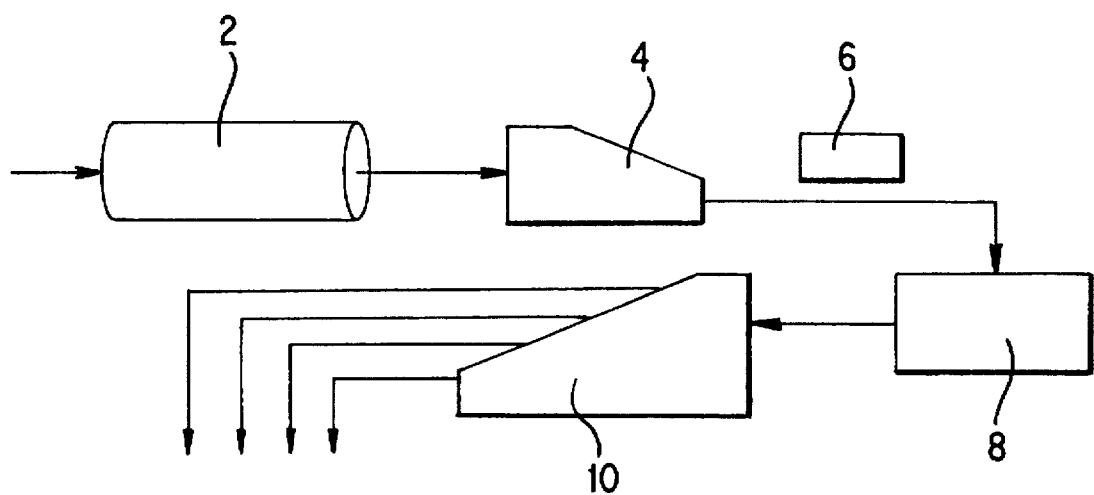
Referring now to FIG. 1, there is shown a schematic diagram of the process for making particles of broken glass used for treating hard surfaces.

Referring now to FIG. 1, there is shown in a schematic view a process for making particles of broken glass used for treating hard surfaces by continually hurling the glass material at high velocity against the hard surfaces, or used to be spread on roads, in accordance with the present invention. The process comprises steps of burning recycled or scrap glass material having a thickness greater than 75/1000 of an inch, the glass material having a hardness greater than 5.5 Mohs, by means of a rotating burner 2 to eliminate unwanted material such as paper, cardboard, polymer, etc. to decontaminate the recycled or scrap glass material; screening coarsely by means of a coarse vibrating screen 4 the glass material obtained from the burning step; submitting the glass material obtained from the screening step to an electromagnet 6 to remove unwanted metal pieces; grinding by means of one or several grinders 8 the glass material obtained from the previous step to produce a broken glass material; and sifting by means of different screenings 10 the broken glass material obtained from the previous step to produce particles of broken glass having sizes of grade 5 (4.00 mm) to grade 60 (0.25 mm), having sharp edges, having a hardness greater than 5.5 Mohs, whereby the particles of broken glass can be used for treating hard surfaces.

It should be appreciated that the glass material must have certain characteristics for replacing in an efficient manner the silica sand. First, it has a minimum hardness of 5.5 Mohs; second, it is obtained from glass parts having a minimum thickness of 75/1000 of an inch and it has sizes of grade 5 to 60. The hardness and the thickness are important because the glass material is used for sandblasting at pressure of about 60 to 100 PSI. If the glass material does not have the required thickness or the required hardness, it shatters into dust during sandblasting and produces dust clouds.

The screenings 10 comprise sieve mesh having sizes of grade 5 to grade 23 so that the particles of broken glass that are screened can be used against cement and brick building walls and against heavy rust.

By selecting sieve mesh having sizes of grade 20 to grade 30, the particles of broken glass that are screened can be used against new steel, structural steel and industrial equipment.

By selecting sieve mesh having sizes of grade 30 to grade 40, the particles of broken glass that are screened can be used against steel girder, material with few cavities and fiber glass.

By selecting sieve mesh having sizes of grade 40 to grade 60, the particles of broken glass that are screened can be used against car surfaces, stainless steel, aluminium and wood.

The present invention can be very useful for recycling glass products because it can use recycled glass material containing heterogeneous glass pieces. At the moment, possibilities for using recycled glass material containing heterogeneous glass pieces are very limited. To produce broken glass material according to the present invention, there is no need for sorting out by color the recycled glass material, which can be very cumbersome.

Another advantage with the present invention resides in the fact that it is possible to obtain abrasive products containing a very low concentration of dust so that the vision of the operator is not reduced by the presence of dust. Also, broken glass material has the advantage of being an inert material.

The particles of broken glass produced according to the present invention are an efficient abrasive for treating hard surfaces to scour, to remove the rust from the surface, to clean the surface, to engrave a hard surface, to produce a given texture so that it provides a better adhesion for paint, glue or similar products.

Figure 2:
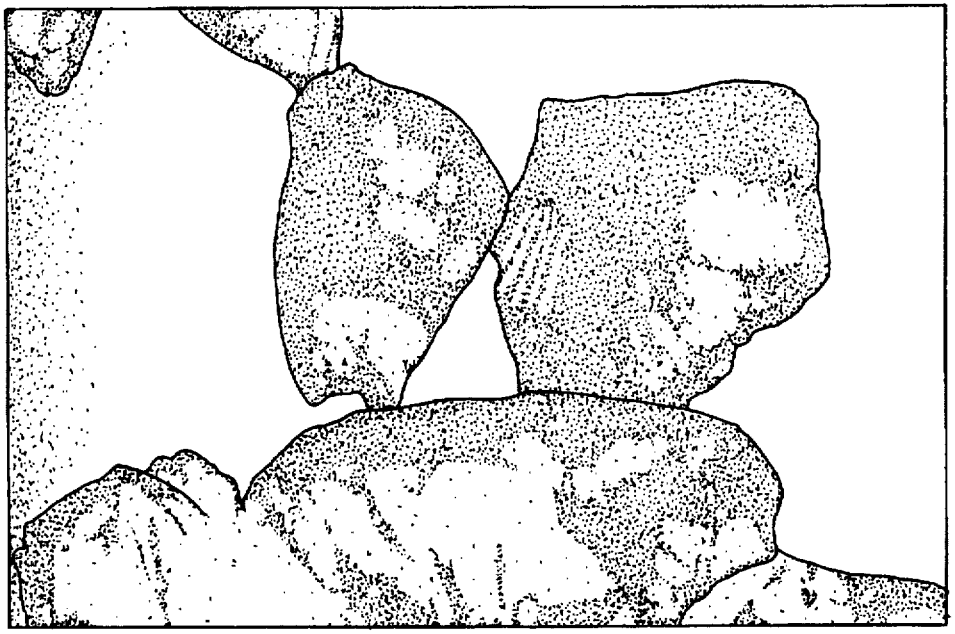
FIG. 2 is an enlarged view of particles of broken glass according to the present invention.
Figure 3:
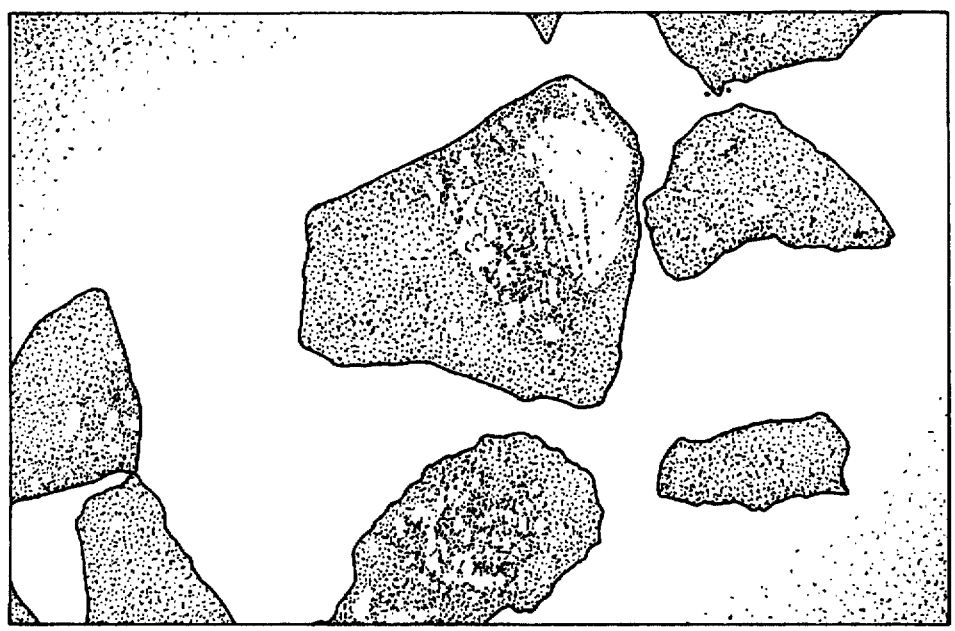
FIG. 3 is an enlarged view of silica sand material that is currently on the market.

Referring now to FIGS. 2 and 3, where there are shown respectively enlarged views by 128 times the particles of broken glass according to the invention, and silica sand material. FIG. 2 shows particles of broken glass having sizes of grade 20 to grade 30. FIG. 3 shows silica sand having a size of grade 24.

From these figures, the shape of the particles of broken glass and silica sand can be easily examined. These figures show that the shape of the two products is very similar. The particles have sharp edges so that an efficient scouring can be obtained by continually hurling the material at high velocity against the hard surface. It has been found that the particles of broken glass can be used to satisfactorily perform outside works (i.e. outdoor projects) which have heretofore been considered difficult works. Also, the particles of broken glass can be used inside a shop and can be recycled for many uses. The method for using the particles of broken glass as an abrasive is substantially the same as the one used for silica sand. The particles are hurled at high velocity under a pressure of 60 to 100 PSI. The nozzle by which the particles are hurled is kept from the surface at a distance of 12 inches to 24 inches at an angle of 30° to 60°.

The particles of broken glass can also be used as abrasive over icy surfaces by simply spreading the broken glass material over the icy surface. As the broken glass material has particles that are very small, there is no danger for pedestrians. Also, this product is not harmful to surfaces made of cement which are eaten into by calcium but not by glass material.

During preliminary production test, particles of broken glass having sizes of grade 10 to grade 20; and grade 20 to grade 30 have been produced. Granulometric distributions of these products are shown respectively in Tables I and II. Table III shows the granulometric distribution of silica sand grade 24. These tables show clearly that the product according to the present invention is characterized by a very low concentration of dust with respect to the silica sand material.

TABLE I

Broken Glass Grade 10–20

| % Mesh sieve size | % Product obtained |
|---|---|
| 10 (2 mm) | 0.1 |
| 20 (850 μm) | 53.5 |
| 30 (600 μm) | 36.5 |
| 40 (425 μm) | 8.8 |
| 50 (300 μm) | 1.0 |
| Smaller | 0.1 |
| | 100.1 |

TABLE II

Broken Glass Grade 20–30

| % Mesh sieve size | % Product obtained |
|---|---|
| 10 (2 mm) | 0.1 |
| 20 (850 μm) | 0.3 |
| 30 (600 μm) | 54.3 |
| 40 (425 μm) | 40.3 |
| 50 (300 μm) | 4.8 |
| Smaller | 0.2 |
| | 100.0 |

TABLE III

Silcon Grade 24

| % Mesh sieve size | % Product obtained |
|---|---|
| 10 (2 mm) | 0.0 |
| 20 (850 μm) | 6.9 |
| 30 (600 μm) | 28.4 |
| 40 (425 μm) | 24.0 |
| 50 (300 μm) | 18.0 |
| Smaller | 22.7 |
| | 100.0 |

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A glass material for treating hard surfaces by continually hurling said glass material at high velocity against said surfaces, comprising particles of broken glass provided from glass parts having a thickness greater than $75/1000$ of an inch, the particles having sized as selected with mesh sieve sizes of grade 5 to grade 60, having sharp edges and having a hardness greater than 5.5 Mohs and the particles having an equi-granular shape.

2. The glass material of claim 1, wherein the equi-granular shape of the glass particles is substantially similar to that of silica sand.

3. A method of using the glass material of claim 1 to treat brick or cement building walls comprising the step of continuously hurling particles of the glass material that have mesh sieve sizes of grade 5 to grade 23 against the brick or cement building walls at high velocity.

4. A method of using the glass material of claim 1 to treat heavily rusted surfaces comprising the step of continuously hurling particles of the glass material that have mesh sieve sizes of grade 5 to grade 23 against the heavily rusted surface at high velocity.

5. A method of using the glass material of claim 1 to treat new steel, structural steel and industrial equipment comprising the step of continuously hurling particles of the glass material that have mesh sieve sizes of grade 20 to grade 30 against the new steel, structural steel and industrial equipment at high velocity.

6. A method of using the glass material of claim 1 to treat steel girder, material with few cavities and fiber glass comprising the step of continuously hurling particles of the glass material that have mesh sieve sizes of grade 30 to grade 40 against the steel girder, material with few cavities and fiber glass at high velocity.

7. A method of using the glass material of claim 1 to treat car surfaces, stainless steel, aluminum and wood comprising the step of continuously hurling particles of the glass material that have mesh sieve sizes of grade 40 to grade 60 against the car surfaces, stainless steel, aluminum and wood at high velocity.

* * * * *

(12) REEXAMINATION CERTIFICATE (4494th)

United States Patent
Grondin

(10) Number: US 5,785,579 C1
(45) Certificate Issued: Nov. 27, 2001

(54) GLASS MATERIAL FOR TREATING HARD SURFACES

(75) Inventor: Roger Grondin, 823 West, 7e rue, Dégelis, Quebec (CA), G5T 1Z3

(73) Assignee: Roger Grondin, Dégelis (CA)

Reexamination Request:
No. 90/005,741, Jun. 8, 2000

Reexamination Certificate for:
Patent No.: 5,785,579
Issued: Jul. 28, 1998
Appl. No.: 08/749,764
Filed: Nov. 20, 1996

Related U.S. Application Data

(63) Continuation-in-part of application No. 07/846,074, filed on Mar. 5, 1992, now abandoned.

(51) Int. Cl.$^7$ ................... B24B 1/00; C09C 1/68
(52) U.S. Cl. .................. 51/307; 51/307; 51/308; 451/41
(58) Field of Search ............... 51/307, 308, 309; 451/38, 41

(56) References Cited

PUBLICATIONS

Apotheker, S., Glass processing: the link between collection and manufacture, *Resource Recycling*, Jul. 1989, vol. VIII, No. 3, pp. 38–43.

*Resource Recycling*, Jun. 1991, pp. 29–30.

Trombly, J., Developing non–traditional glass markets, *Resource Recycling*, Oct. 1991, pp. 71–74.

Universal Ground Cullet, Inc., catalog, Sep. 19, 1988.

Tooley, F.V., *The Handbook of Glass Manufacture*, 3rd Ed., vol. II, 1984, pp. 673, 682–16, 695. (no month).

*Glass Markets Information System Application Records*, Clean Washington Center, Washington State Department of Trade and Economic Development, Dec. 1992.

*Voluntary Product Standard PS 73–77, Carbonated Soft Drink Bottles*, U.S. Department of Comemerce, American National Standard ANSI/VPS PS 73–77, Dec. 1977, pp. 1–9.

*GRAINGER Industrial and Commercial Equipment and Supplies*, General Catalog No. 379, 1991. (no month).

Avallone, E.A. et al., *Marks' Standard Handbook for Mechanical Engineers*, Ninth Edition, 1987, p. 6–156. (no month).

McGrath, A., Recycling Glass Waste: The Dumpster Dilemma, *Glass Magazine*, Mar. 1991.

*Primary Examiner*—Michael Marcheschi

(57) ABSTRACT

The glass material for treating hard surfaces by being continually hurled at high velocity against the surfaces, includes substantially particles of broken glass provided from glass parts having a thickness greater than $75/1000$ of an inch, the particles having sizes as selected with mesh sieve sizes of grade 5 to grade 60, having sharp edges and having a hardness greater than 5.5 Mohs.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–7 are cancelled.

* * * * *